(12) United States Patent
Messner et al.

(10) Patent No.: US 6,480,323 B1
(45) Date of Patent: Nov. 12, 2002

(54) TWO-DIMENSIONAL BEAM SCANNER

(75) Inventors: William C. Messner, Pittsburgh, PA (US); Daniel D. Stancil, Mars, PA (US); Tuviah E. Schlesinger, Mount Lebanon, PA (US)

(73) Assignee: Carnegie Mellon University, Pittsburgh, PA (US)

( * ) Notice: Subject to any disclaimer, the term of this patent is extended or adjusted under 35 U.S.C. 154(b) by 0 days.

(21) Appl. No.: 09/216,472

(22) Filed: Dec. 18, 1998

(51) Int. Cl.[7] .............................................. G02B 26/08
(52) U.S. Cl. ...................... 359/298; 359/288; 359/201; 359/202; 359/305; 359/315
(58) Field of Search ................ 359/201, 202, 359/315, 305, 320, 298, 288

(56) References Cited

U.S. PATENT DOCUMENTS

| | | |
|---|---|---|
| 4,124,273 A | 11/1978 | Huignard et al. |
| 4,701,006 A * | 10/1987 | Perlmutter ..................... 359/9 |
| 4,765,703 A | 8/1988 | Suzuki et al. |
| 4,767,170 A | 8/1988 | Mizutani et al. |
| 4,792,201 A | 12/1988 | Suzuki et al. |
| 4,902,088 A | 2/1990 | Jain et al. |
| 4,925,261 A | 5/1990 | Byckling et al. |
| 5,052,771 A | 10/1991 | Williams et al. |
| 5,138,482 A * | 8/1992 | Hatori et al. ................ 359/305 |
| 5,317,446 A | 5/1994 | Mir et al. |
| 5,418,871 A * | 5/1995 | Revelli, Jr. et al. ........... 385/44 |
| 5,563,730 A * | 10/1996 | Singh et al. ................. 359/321 |
| 5,714,240 A * | 2/1998 | Gupta et al. ................. 428/209 |
| 6,229,561 B1 * | 5/2001 | Son et al. ...................... 348/42 |

* cited by examiner

*Primary Examiner*—Hung Xuan Dang
*Assistant Examiner*—Tuyen Tra
(74) *Attorney, Agent, or Firm*—Kirkpatrick & Lockhart LLP (57) ABSTRACT

A device that includes a projection element positioned between first and second beam scanners configured in series and a two-dimensional display plane. An apparatus for controlling the first and second beam scanners is provided so that the angle of incidence and the point of incidence of a beam output from the series connected beam scanners onto the projection element are controlled. In that manner, each point on the projection element can be mapped to a line in the display plane. A method of mapping a point in the projection element to a line in the display plane is also disclosed.

51 Claims, 12 Drawing Sheets

TWO-DIMENSIONAL BEAM SCANNER

CROSS-REFERENCE TO RELATED APPLICATIONS

Not Applicable.

FEDERALLY SPONSORED RESEARCH

Not Applicable.

BACKGROUND OF THE INVENTION

1. Field of the Invention

The present invention relates generally to display devices and, more particularly, to two-dimensional beam scanners.

2. Description of the Invention Background

Varying the direction at which a beam is projected has been accomplished in various ways. A basic method for redirecting a beam is to move the source of the beam. When complex or high speed motion is required, however, this method becomes impractical because of the size of the source and the electrical connections that must be maintained to power the beam.

Mechanical beam scanning systems, such as spinning polygon mirrors, have been used to reflect a beam onto a two-dimensional display plane. Scanning along both the X and Y axes of the two-dimensional display plane is generally accomplished by the use of two such polygonal mirrors. The first mirror moves about one axis to scan the beam in the direction perpendicular to the axis. The beam impinges on the first mirror which varies the position and angle of incidence of the beam on the second mirror. The second mirror moves about a second axis, orthogonal to the axis of the first mirror, to scan the beam orthogonally to the scan direction of the first mirror. Spinning mirrors can be troublesome because they require large mechanisms to move the mirrors. To achieve high scanning speed, larger, more costly and less controllable drives typically must be coupled with multifaceted mirrors. High scanning speed can be further limited by deformation of the mirror, due to centrifugal forces, and motor bearing limitations. The use of less controllable drives and the deformation of the mirrors can also result in reduced beam placement accuracy. Therefore, high scanning speed in mechanical scanners is generally achieved at the cost of reduced accuracy. Additional distortions are also introduced into the projected beam because the facets of the spinning mirrors cannot be perfectly ground.

Spinning mirrors are also sequential devices, incapable of displaying discrete points without progressively moving the beam across the display plane from a first point to a second point. Progressive beam movement is inherent in spinning mirrors because spinning mirrors must be turned from one position to another over time, thereby scanning the beam across all intermediate display points and forming a line between the desired display points. Spinning mirrors, therefore, cannot be instantaneously adjusted to display the beam on any display plane point.

Non-mechanical beam scanners have been utilized to vary the direction of a beam but have not been effectively applied in two-dimensional beam scanning applications. Non-mechanical beam scanners vary the direction at which a beam of light, incident on the beam scanner's input surface, is output from the beam scanner's output surface. Non-mechanical beam scanners deflect a beam with no physical movement of the scanner. It is a characteristic of non-mechanical beam scanners to vary the amount of deflection as a function of acoustic, electric, thermal, or other form of energy applied to the scanner. Non-mechanical scanners are advantageous because they are comparatively small and easily portable and do not have moving parts to wear or fail.

In one embodiment of an electro-optic beam scanner disclosed in U.S. Pat. No. 5,317,446 to Mir et al., the angle of beam deflection is dependent on an electric field applied to an electro-optic prism array. The electrical field polarizes the prism array, thereby deflecting the beam in a single plane. The degree of deflection of the beam is infinitely adjustable and may be controlled by controlling the level of the electrical field applied. Acousto-optic and thermo-optic beam scanners have also been developed. In an acousto-optic beam scanner, the angle of deflection of the beam may be controlled by controlling an acoustic field applied to the optic material. In a thermo-optic beam scanner the angle of deflection of the beam may be controlled by controlling the temperature of the optic material.

Some non-mechanical beam scanners are capable of deflecting a beam in a single plane so that the beam output therefrom is capable of forming a line on a two-dimensional display plane. There is a need, however, to have more complicated shapes projected in two dimensions. U.S. Pat. No. 4,925,261 to Byckling et al. suggests that two beam scanners be placed in series such that the first beam scanner deflects the beam in the X-direction and the second beam scanner deflects the beam in the Y-direction. The problem with that method is the difficulty of creating a beam scanner that is capable of receiving a beam over a significant range of input points corresponding to output points of the first scanner in the series. Beam scanners are typically constructed with beam input and beam output surfaces that are broad in the plane in which the beam is deflected and thin in the perpendicular direction. That is because broad, thin sections of optic material are easy to polarize and thus capable of precise control over large angles of deflection. Thick sections of optic material require greater amounts of power to polarize and are difficult to uniformly polarize. Therefore, optic material is kept thin to minimize power requirements and maximize controllability. To accept a beam at any number of planes displaced in a direction perpendicular to the deflection plane would require that the optic material be thick enough to accept the full range of potential output positions of the first beam scanner. That, in turn, increases the power required to deflect the beam through a thicker crystal and makes it-more difficult to control the amount of deflection.

U.S. Pat. No. 4,902,088 to Jain et al. presents a single beam scanner scanning in only the X direction which is incident on holographic facets. The beam is intended to be incident on a single holographic facet at a time. Each holographic facet is capable of changing the direction of the beam in both the X and Y directions. That apparatus is thereby capable of creating a two-dimensional display. That apparatus, however, has the limitation that each point of incidence on the facets has only one possible Y direction of diffraction.

U.S. Pat. No. 4,902,088 to Jain et al. also presents a single beam scanner scanning in only the X direction which is incident on multiple diffraction gratings. In that configuration each diffraction grating may be separately energized such that each point of incidence on the diffraction gratings may be directed to a single point in the Y direction for each grating present in the apparatus. That apparatus has the limitation that each point of incidence on the diffraction gratings may only be refracted to a number of points in the Y direction equal to the number of diffraction gratings present.

Accordingly, a need exists for an infinitely adjustable, cost effective, non-mechanical beam scanner and a method for projecting a beam onto a display plane in two-dimensions.

SUMMARY OF THE INVENTION

The present invention is directed broadly to a device comprised of a projection element having an intermediate surface, first and second beam scanners configured in series, a two-dimensional display plane and an apparatus for controlling the first and second beam scanners. The two beam scanners are for receiving an input beam and outputting an output beam so as to vary an angle of incidence of the output beam with respect to the intermediate surface and a point of incidence of the output beam on the intermediate surface. The two-dimensional display plane is provided to receive a beam projected from the intermediate surface. The device also includes an apparatus that controls the beam scanners such that each point of incidence on the intermediate surface maps to a line on the two-dimensional display plane by varying the angle of incidence.

The present invention is also directed to a method of projecting a beam onto a two-dimensional display plane. The method includes passing a beam through series configured beam scanners to produce an output beam and controlling both the angle of incidence of the output beam with-respect to an intermediate surface and the point of incidence on the intermediate surface. The angle of incidence and the point of incidence determine the path of a beam projected from the intermediate surface onto the two-dimensional display plane.

The present invention offers the advantage of varying the position of a display point, arbitrarily, and at high speed. It allows unlimited variation on a two-dimensional display plane in both the X and Y directions. The present invention is small and portable, having no moving parts to wear or fail, and it functions using beam scanners that require minimal power and are easily controllable. Those advantages and benefits, and others, will become apparent from the Detailed Description of the Invention hereinbelow.

BRIEF DESCRIPTION OF THE DRAWINGS

For the present invention to be clearly understood and readily practiced, the present invention will be described in conjunction with the following figures, wherein.

DETAILED DESCRIPTION OF THE INVENTION

It is to be understood that the figures and descriptions of the present invention have been simplified to illustrate elements that are relevant for a clear understanding of the present invention, while eliminating, for purposes of clarity, other elements found in typical beam scanning apparatuses. Those of ordinary skill in the art will recognize that other elements may be desirable to implement an apparatus which will incorporate the present invention. However, because such elements are well known in the art, and because they do not facilitate a better understanding of the present invention, a discussion of such elements is not provided herein.

Figure 1:
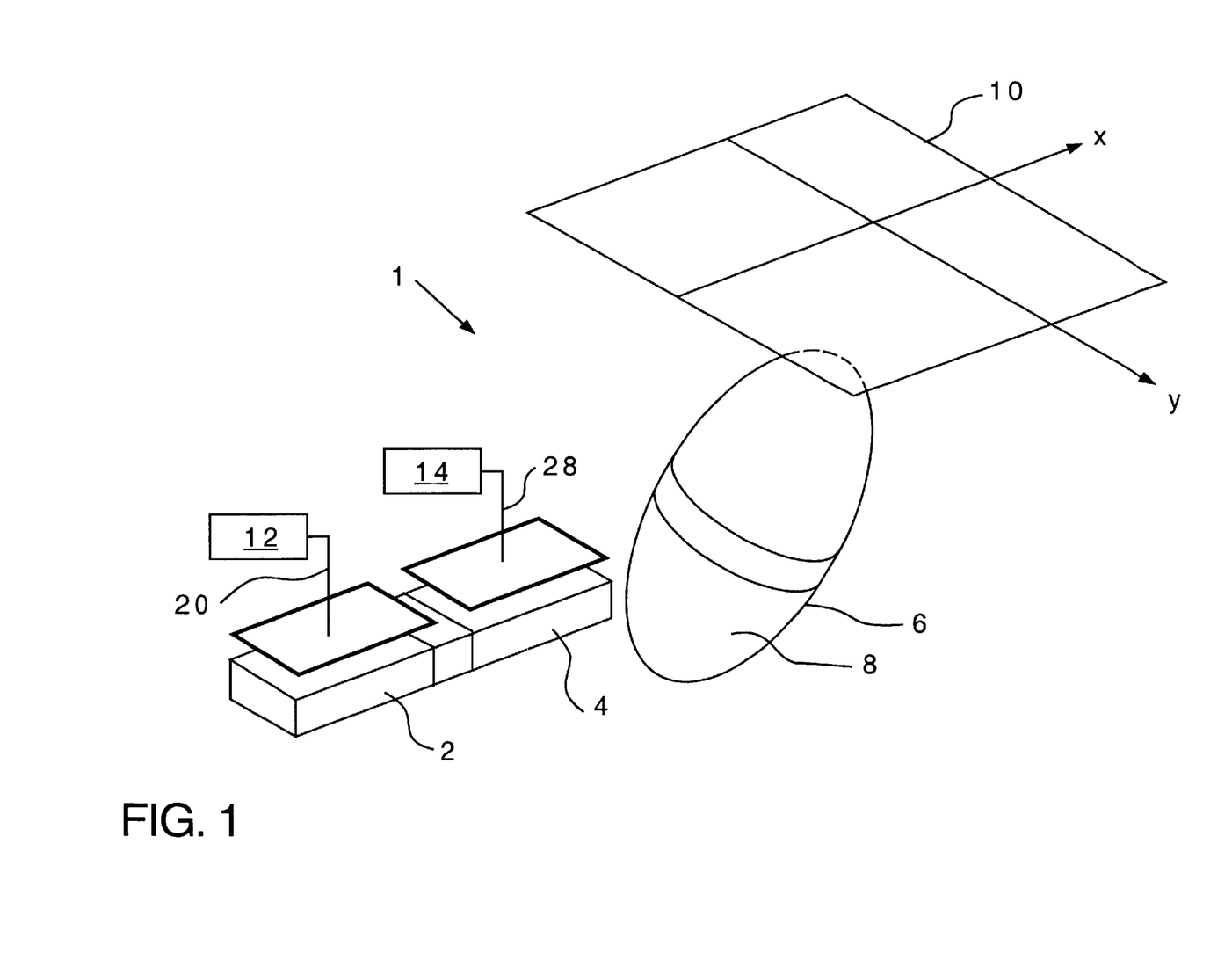
FIG. 1 is a perspective view of a device constructed in accordance with the present invention.

FIG. 1 illustrates a device 1 constructed in accordance with the present invention. The device 1 includes a first beam scanner 2 and a second beam scanner 4 configured in series. A projection element 6 has an intermediate surface 8. The projection element 6 is positioned to project a beam from the intermediate surface 8 onto a two-dimensional display plane 10. A first control apparatus 12 applies a first control signal 20 that controls the first beam scanner 2. A second control apparatus 14 similarly applies a second control signal 28 that controls the second beam scanner 4. The first and second control signals 20, 28 may be, for example, electric, acoustic, or thermal fields applied to the optic material of the beam scanners 2, 4.

The beam scanners 2, 4 may be any one of many different designs including electro-optic, acousto-optic, thermo-optic and other forms of beam scanners. The projection element 6 may be any element having an appropriate intermediate surface 8 that is capable of mapping beams having the same point of incidence on the intermediate surface 8, but varying angles of incidence with respect to the intermediate surface 8, to a line on the two-dimensional display plane 10. For example, a mirror or a lens could be employed to perform that projection function. A curved mirror may perform the mapping function by projecting a beam, via reflection, onto the two-dimensional display plane 10. Alternately, a segmented mirror comprising a one dimensional array of discrete flat mirror segments oriented at different angles may map the beam to the display plane 10. When a segmented mirror is utilized, the two-dimensional coordinate at which the beam is projected, via reflection, on the display plane 10, will vary dependent on the mirror segment on which the beam is directed. A lens may be employed to perform the mapping function by projecting a beam, via focusing, onto the two-dimensional display plane 10.

Figure 2:
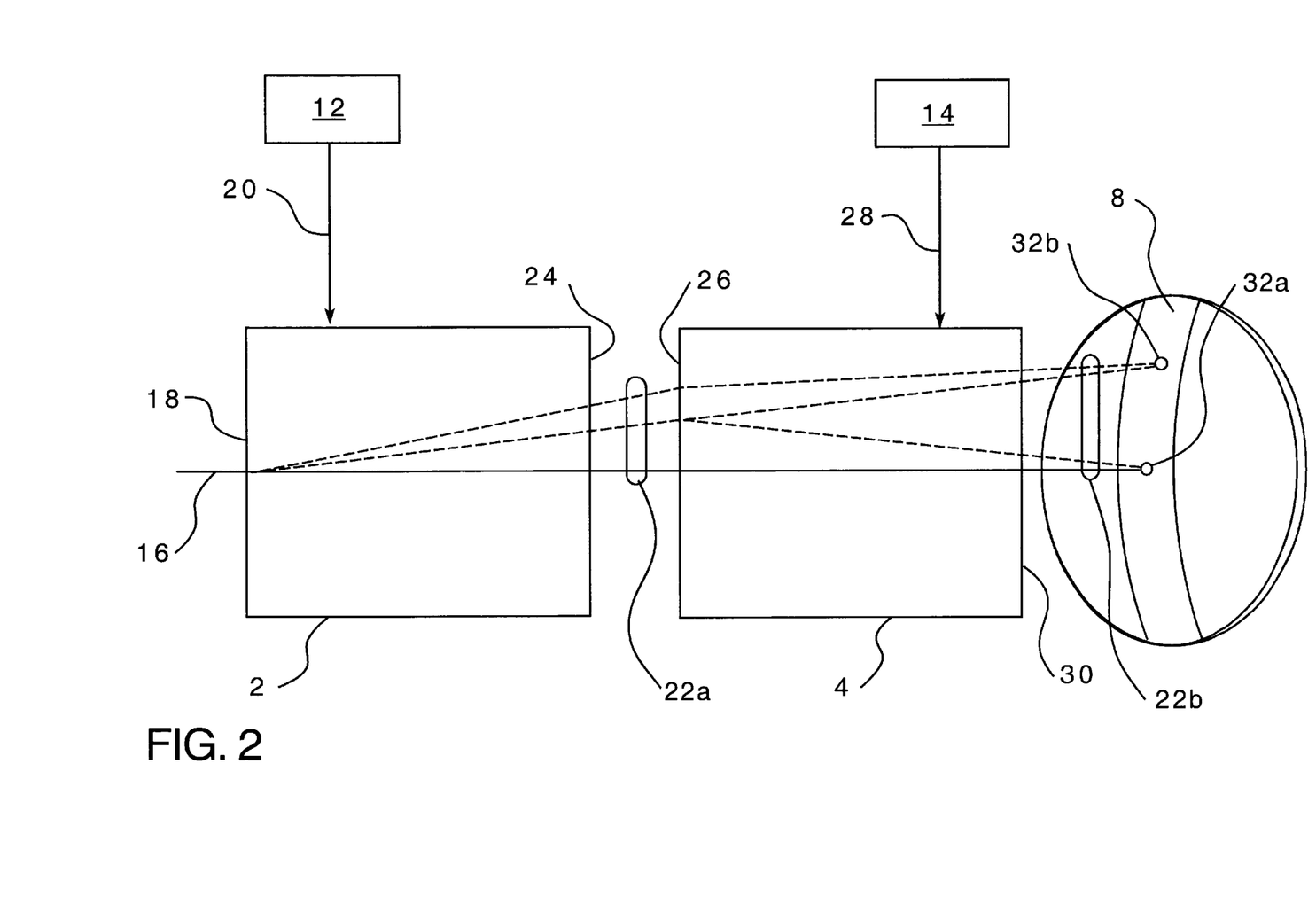
FIGS. 2 through 5 are top plan views of the beam scanners illustrated in FIG. 1 with various beams added to help explain the operation of the present invention.

FIG. 2 illustrates the beam scanners 2, 4 of the present invention. Each beam scanner 2, 4 may deflect a beam in a plane without physical movement of the beam scanners 2, 4. The beam scanners 2, 4 may, furthermore, be configured to deflect the beam in the same plane. The deflected beam may be output from the serially aligned beam scanners 2, 4 onto,the intermediate surface 8. The first and second beam scanners 2, 4 and intermediate surface 8 illustrated in FIG. 2 are arranged in such a configuration.

An input beam 16 such as, for example, a laser beam of a beam of light, is shown directed onto a first input area 18 of the first beam scanner 2. The first control apparatus 12 may control the first beam scanner 2 by applying a first control signal 20 so as to control the angle of deflection of a transitional output beam 22a output from a first output area 24. The transitional output beam 22a may then be incident on a second input area 26 of the second beam scanner 4. The second control apparatus 14 may control the second beam scanner 4 by applying the second control signal 28 so as to control the angle of deflection of an output beam 22b to a desired, angle. The output beam 22b may then be output from a second output area 30 so as to be incident on the intermediate surface 8. The invention may output the output beam 22b onto an infinite number of points of incidence 32a, 32b on the intermediate surface 8. The range over which points of incidence 32a, 32b may be output onto the intermediate surface 8 is limited only by the operational range of the selected beam scanners 2, 4. The angle of incidence of the output beam 22b with respect to, the intermediate surface 8 is also infinitely adjustable and the range over which the angle of incidence may be varied is also limited only by the operational range of the selected beam scanners 2, 4.

In FIG. 2, the solid line illustrates one path for the input beam 16 through the beam scanners 2, 4 to the point of incidence 32a. To direct the input beam 16 to the point of incidence 32a with an angle of incidence as shown in FIG. 2, the first control apparatus 12 applies the first control signal 20 to the first beam scanner 2 so that transitional output beam 22a is not deflected at any angle. The second control signal 28 is applied to the second beam scanner 4 such that output beam 22b is also not deflected at any angle. Output beam 22b is thus incident on the intermediate surface 8 at point of incidence 32a.

Figure 3:
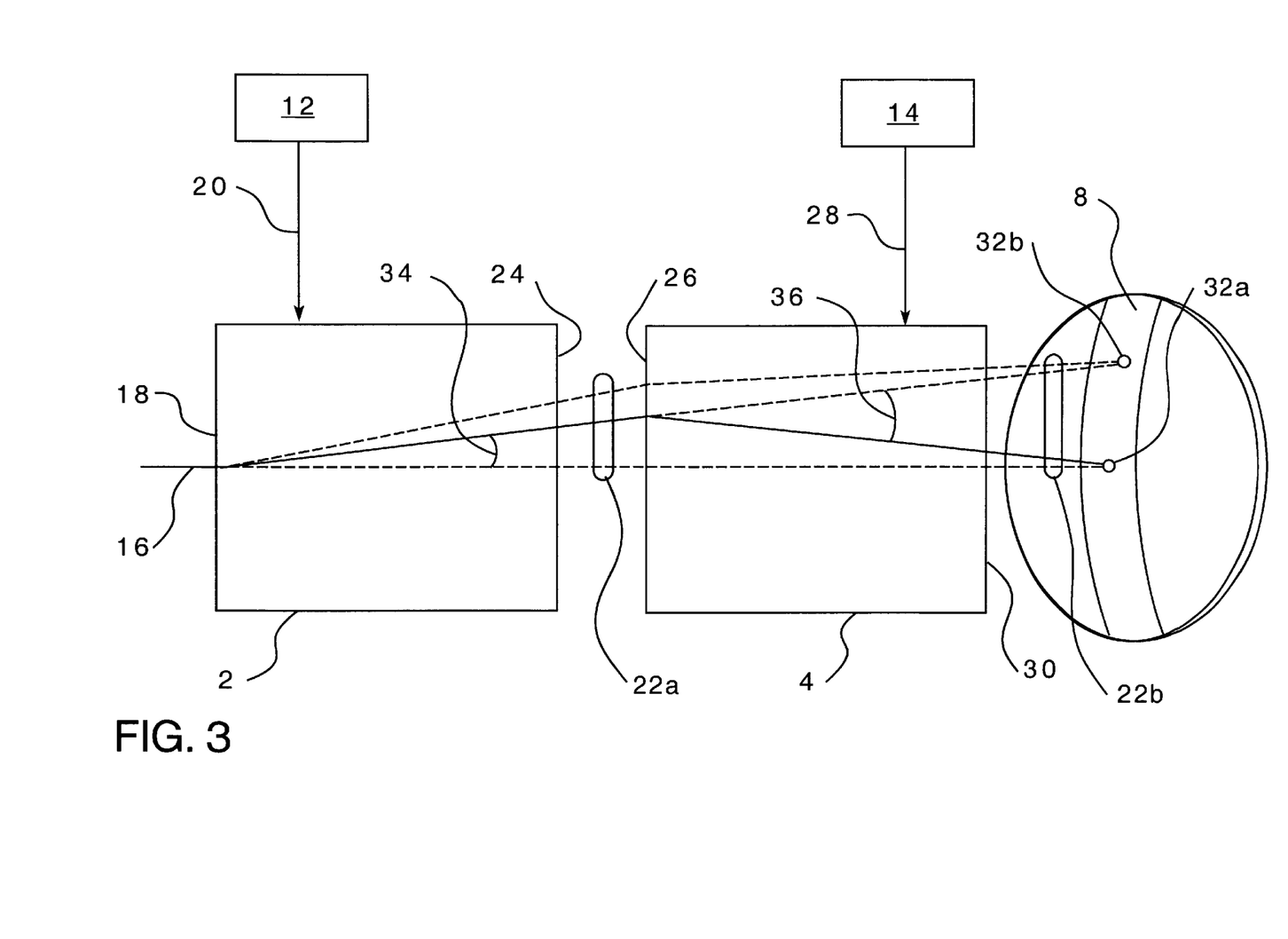

In FIG. 3, the solid line illustrates how the input beam 16 may take a path different from the path shown by the solid line in FIG. 2, which results in the same point of incidence but a different angle of incidence. The angle of transitional output beam 22a is controlled by applying the first control signal 20 by way of the first control apparatus 12 to the first beam scanner 2 so that transitional output beam 22a is deflected by a first angle of deflection 34. The second control signal 28 is applied by way of the second control apparatus 14 to the second beam scanner 4 such that output beam 22b is deflected by a second angle of deflection 36 in the opposite direction of the first angle of deflection 34. Thus, output beam 22b has the same point of incidence 32a as in FIG. 2, but a different angle of incidence.

Figure 4:
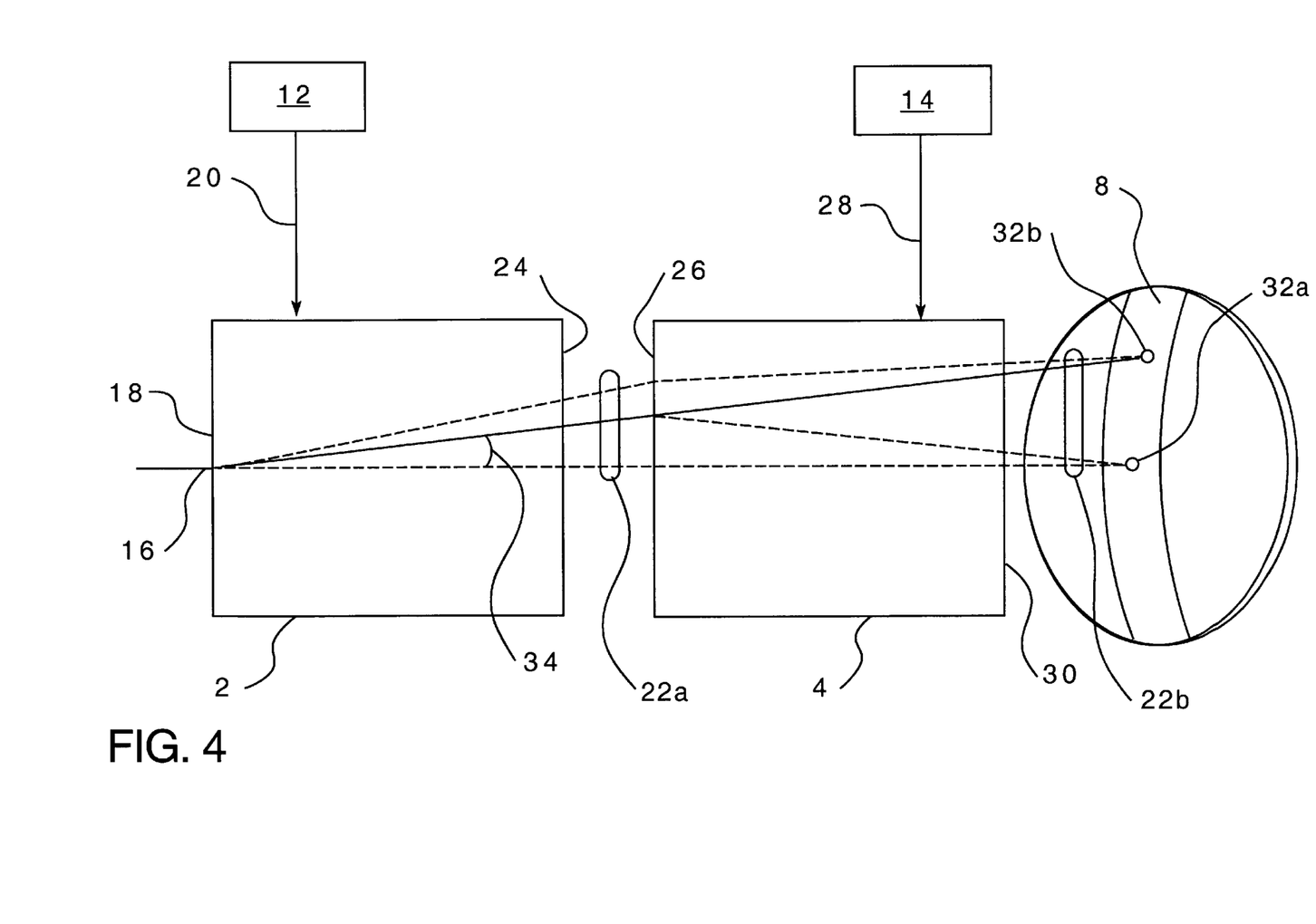

The solid line in FIG. 4 illustrates another path of the input beam 16 through scanners 2, 4. The path shown in FIG. 4 results in a point of incidence 32b that is different from point of incidence 32a. The point of incidence 32b was obtained by altering the second control signal 28 so that there is no second angle of deflection through second beam scanner 4. The first angle of deflection 34 in FIG. 4, meanwhile, remains the same as the first angle of deflection 34 in FIG. 3.

Figure 5:
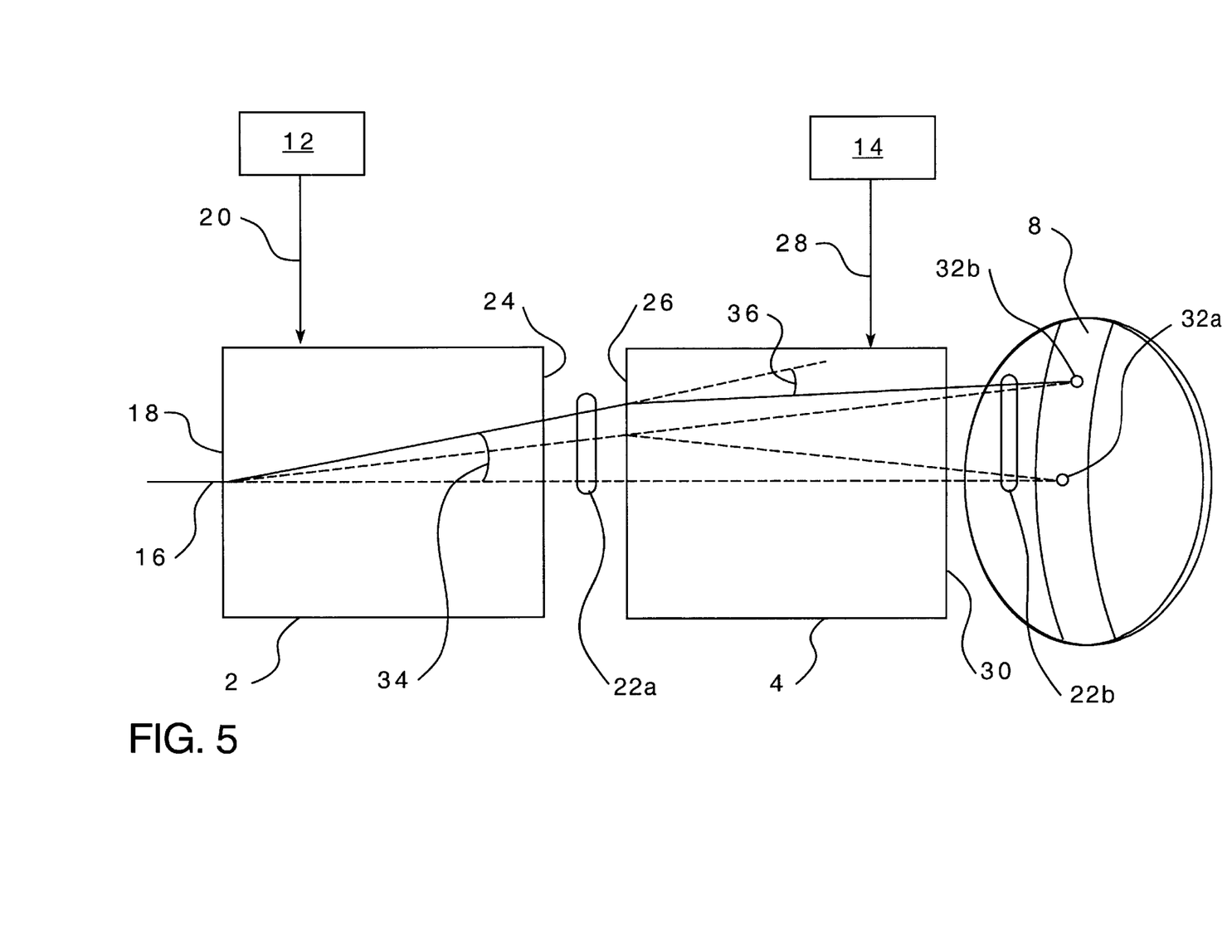

In FIG. 5, the solid line illustrates how the input beam 16 may take a path different from the path shown by the solid line in FIG. 4, which results in the same point of incidence 32b but a different angle of incidence. The path of the input beam 16 of FIG. 5 is created by changing both angles of deflection 34, 36. By changing the angles of deflection 34, 36 of both beam scanners 2, 4, respectively, the same point of incidence 32b is achieved, but a different angle of incidence results.

As seen from FIGS. 2–5, the point of incidence of the output beam 22b on the intermediate surface 8 and the angle of incidence of the output beam 22b with respect to the intermediate surface 8 are both independently adjustable via the first and second control apparatuses 12, 14. The point of incidence and the angle of the incidence may be controlled through the application of control signals 20, 28 produced by the first and second control apparatuses 12, 14. The control apparatuses 12, 14 may, furthermore, be under the control of a microprocessor or computer (not shown).

Figure 6:
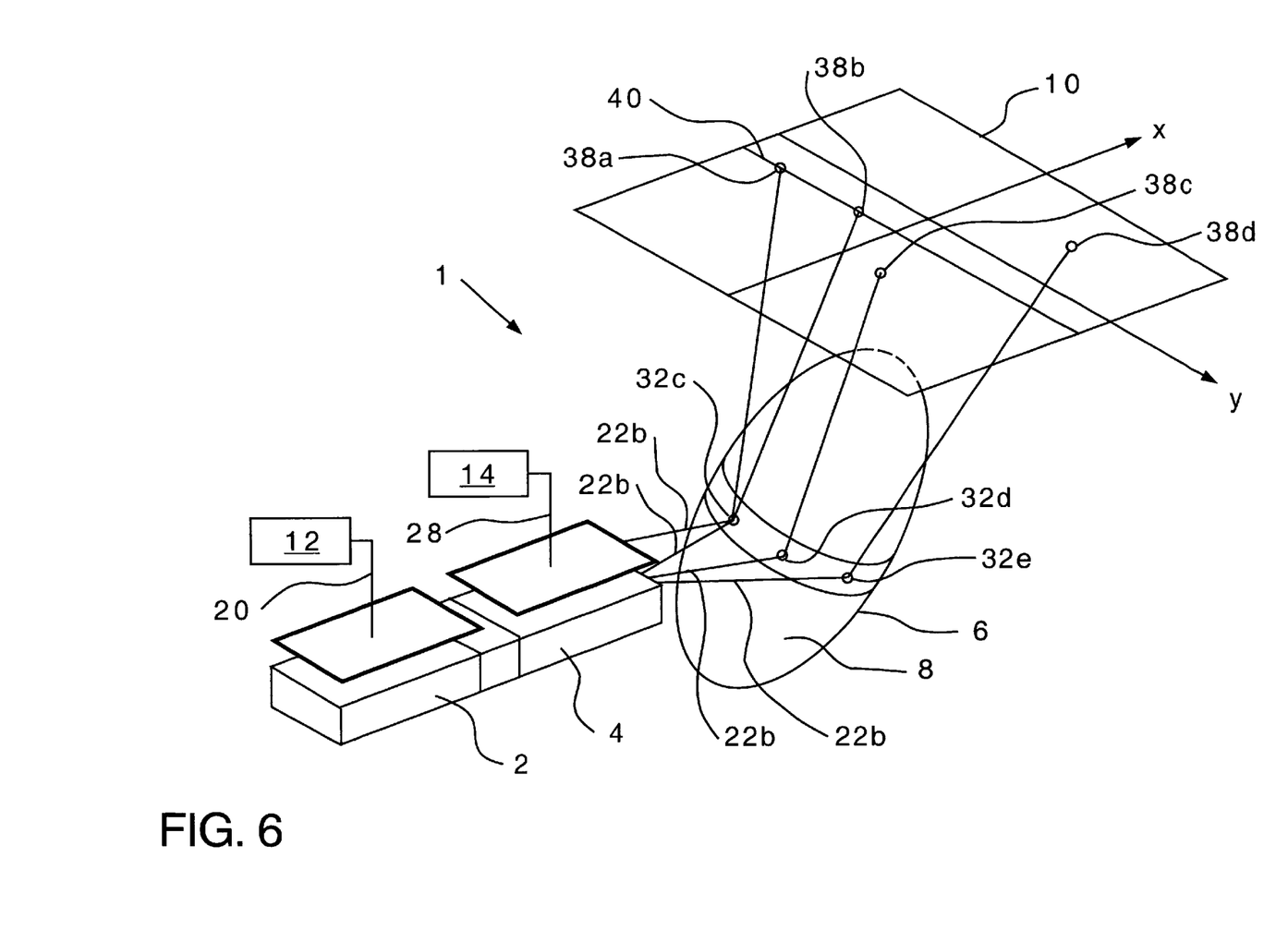
FIG. 6 is a perspective view of the device illustrated in FIG. 1, wherein output beams are projected onto an intermediate surface and from the intermediate surface onto a two-dimensional display plane.

FIG. 6 illustrates four of the infinite number of display points 38 that may be projected onto the two-dimensional display plane 10 by controlling the point of incidence 32 of the output beam 22b on the intermediate surface 8 and the angle of incidence of the output beam 22b with respect to the intermediate surface 8. It is an advantage of the present invention that a series of discrete display points 38 may be displayed successively on the two-dimensional display plane 10. Rotating mirrors allow only sequential scanning because they must be turned over time, necessarily forming a line between the desired points. The control signals 20, 28 of the present invention, conversely, may be stepped rather than sequentially scanned, permitting the display of a series of discrete display points 38.

A single point of incidence 32 on the intermediate surface 8 maps to a display line 40 on the two-dimensional plane 10 by varying the angle of incidence of the output beam 22b with respect to the intermediate surface 8. Therefore, discrete display points 38 on a single display line 40 may be displayed by outputting the output beam 22b at varying angles to the same point of incidence 32 on the intermediate surface 8. Display points 38a and 38b, for example, are both projected from the same point of incidence 32c, but they are formed by output. beams 22b that are incident on the intermediate surface 8 at different angles. The display line 40 may be a straight line or a curved line and the display lines 40 formed by output beams 22b having different points of incidence 32 may cross one another.

Display points 38 not lying on the same display line 40 may be displayed by outputting output beam 22b to a different point of incidence 32. Display points 38c and 38d, for example, are projected from different points of incidence 32d and 32e respectively. Therefore, display points 38c and 38d do not fall on the same display line, assuming display lines are drawn so as to be parallel to line 40. Display points 38c and 38d, similarly, do not fall on the display line 40 on which display points 38a and 28b fall because display points 38c and 38d are projected from points of incidence 32d and 32e, respectively, while display points 38a and 38b are projected from different point of incidence 32c.

Figure 7:
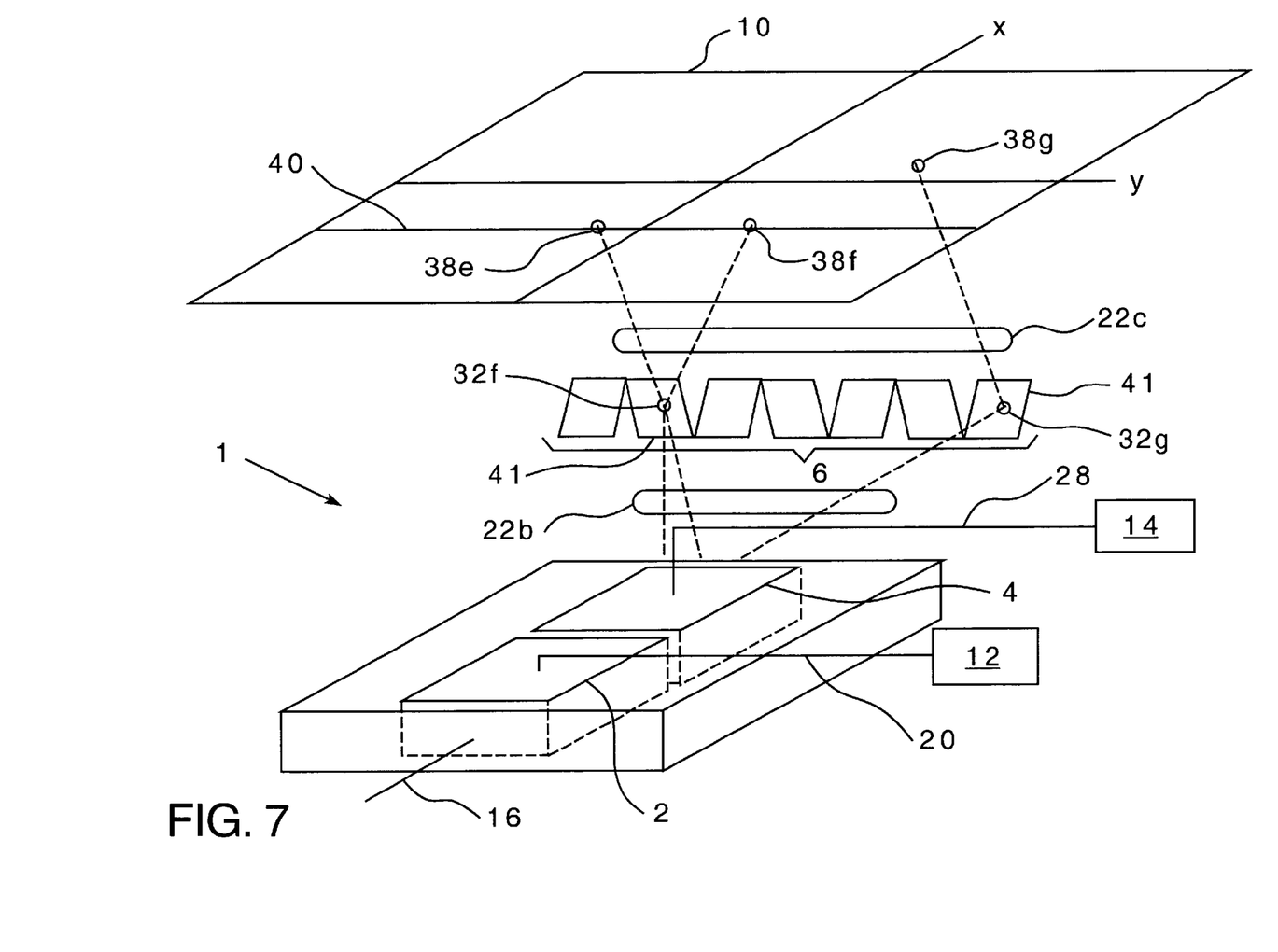
FIG. 7 is a perspective view of another embodiment of the present invention, wherein output beams are projected onto a segmented linear mirror and from the segmented linear mirror onto a two-dimensional display plane.

FIG. 7 illustrates an alternative embodiment of the present invention in which the projection element 6 is a segmented linear mirror. The segmented linear mirror includes mirror segments 41 that may be flat and may be arranged in fixed locations. The mirror segments 41 are oriented at varying angles with respect to each other such that the two-dimensional display plane 10 coordinates to which the projected beam 22c is directed is dependent on which of the mirror segments 41 the light impinges, and the angle at which the projected beam 22b is incident on the mirror segment 41. As may be seen from FIG. 7, the use of a segmented linear mirror will permit the display of points, for example, 38e and 38f, on a display line 40 by altering the angle of incidence of the output beam 22b with respect to a mirror segment 41. The segmented linear mirror will also permit the display of points, for example 38g, that do not lie on the same display line 40 by altering the point of incidence 32f, 32g of the output beam 22b. By permitting the display of point along multiple, substantially parallel lines on the two-dimensional display plane 10, the display points 38e, 38f, 38g projected by the segmented linear mirror may be moved along both the X and Y axes of the two-dimensional display plane 10.

Figure 8:
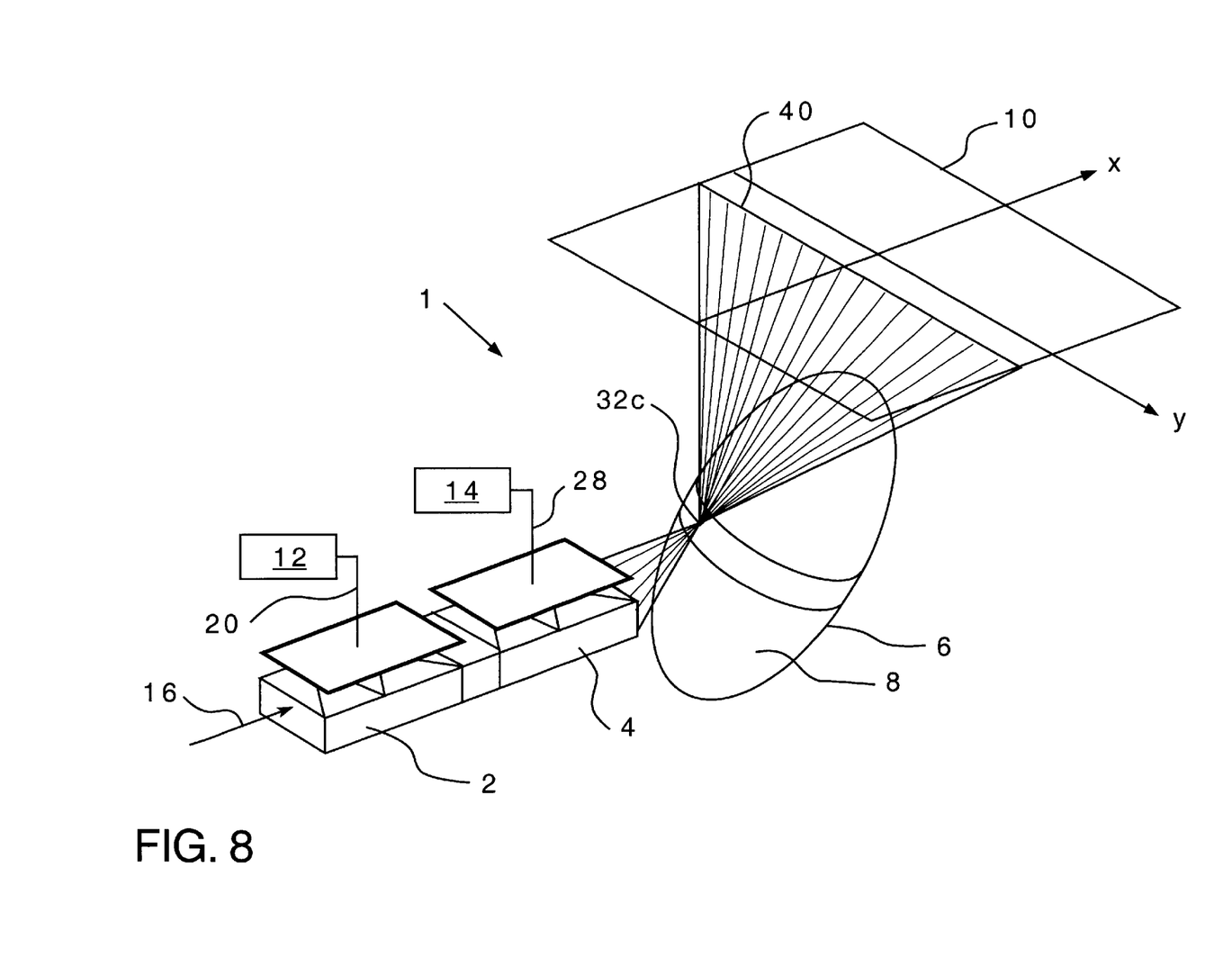
FIG. 8 is a perspective view of the device illustrated in FIG. 1, wherein the point of incidence on the intermediate surface is constant and the angle of incidence with respect to the intermediate surface is varied forming a line on the two-dimensional display plane.

FIG. 8 illustrates how an input beam 16 may be output, at varying angles of incidence, onto the same point of incidence 32c on the intermediate surface 8 to form a display line 40 on the two-dimensional-display plane 10 similar to a display line formed by a rotating mirror. A series of display lines 40 may be formed by outputting the output beam 22b to a point of incidence 32, scanning through the desired range of angles of incidence, stepping the output beam 22b to a new point of incidence 32, and repeating the scanning and stepping process. When the segmented linear mirror of FIG. 7 is employed, a display line 40 may be projected by directing the projected beam 22c, at varying angles, at a single mirror segment 41. Additional display lines may be projected by outputting the output beam 22b on other mirror segments 41. The use of multiple mirror segments 41 permits display lines 40 to be spaced at discrete intervals by orienting the mirror segments 41 at appropriate angles.

To output the output beam 22b to a single point of incidence 32 while varying the output beam's angle of incidence typically requires that the control signals 20, 28 to both beam scanners 2, 4, respectively, be altered. Each beam scanner 2, 4 operates to vary the angle of deflection 34, 36 at which it outputs a beam 22a, 22b, respectively. Each beam scanner 2, 4 in FIG. 8 is, furthermore, varying the angle of deflection in the same plane. Therefore, a change in the first angle of deflection 34 will typically be offset by an opposite change in the second angle of deflection 36 when an output beam 22b is to be projected to the same point of incidence 32. The angle of incidence and point of incidence 32 may, nonetheless, be separately adjusted by varying the control signals 20, 28 to both beam scanners 2, 4.

The device 1 of the present invention may also be configured to operate as a two-dimensional optical switch. In such an application, the display plane 10 may, for example, contain inputs to optical fibers (not shown). The device 1 may, furthermore, direct the projected beam 22c onto the inputs to actuate the desired optical fibers because of the device's 1 ability to randomly access any point on the display plane 10. The beam scanning device 1 of the present invention advantageously provides high speed and accuracy in both random access and display line scanning applications.

Figure 9:
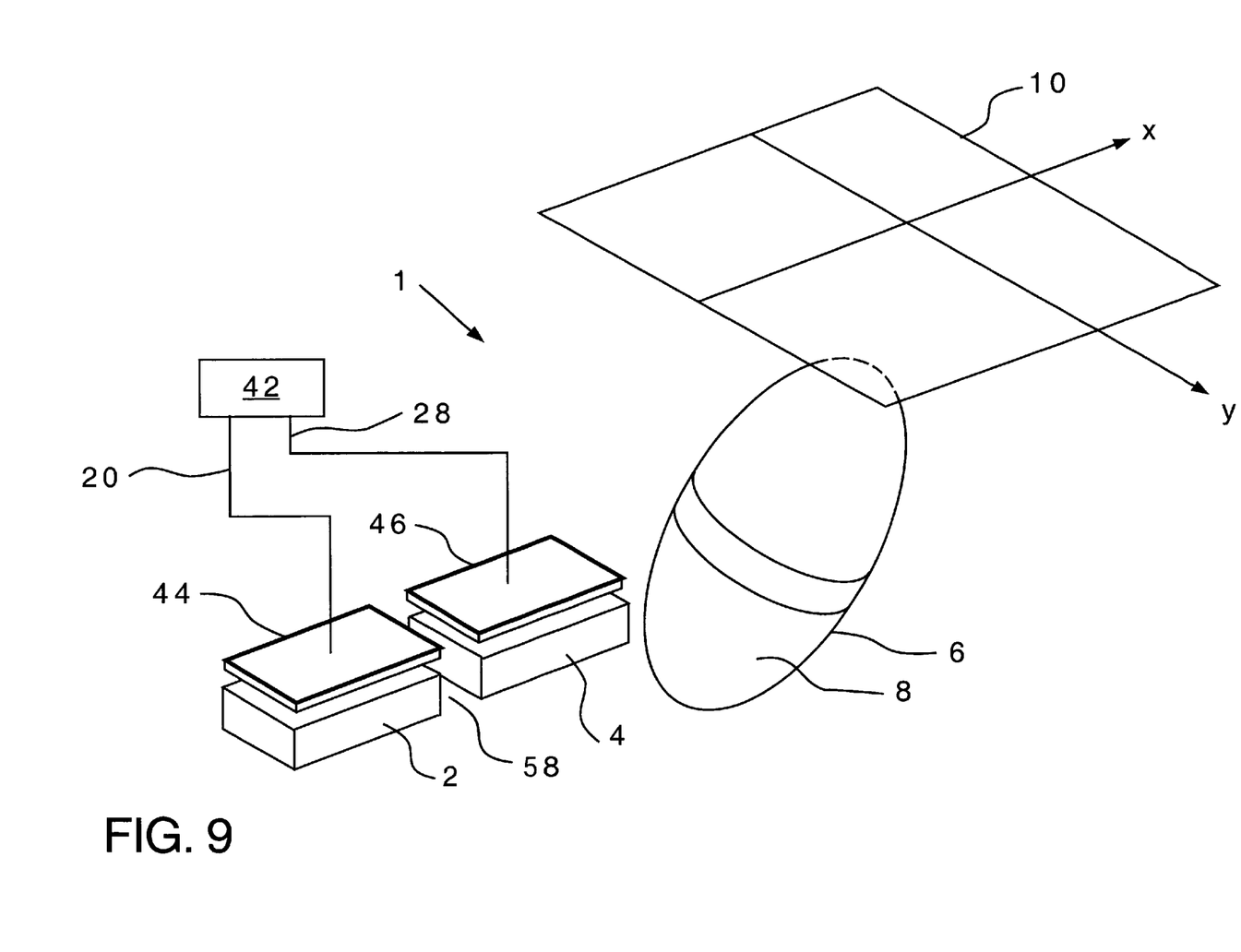
FIG. 9 is a perspective view of the device illustrated in FIG. 1 wherein a computer controls the first and second beam scanners through first and second transducers.
Figure 10:
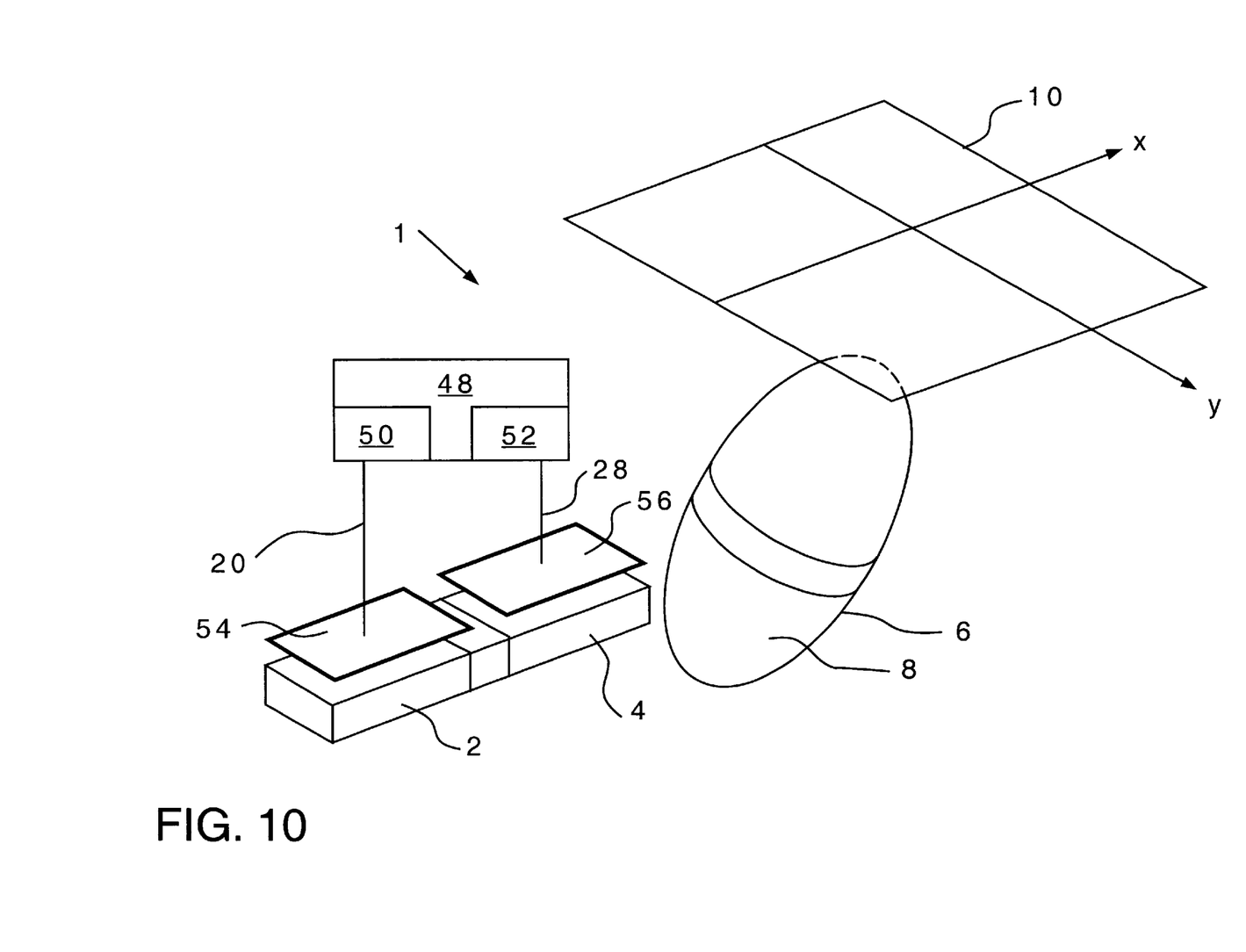
FIG. 10 is a perspective view of the device illustrated in FIG. 1, wherein an apparatus for controlling the first and second beam scanners includes first and second adjustable power sources and first and second electrodes.
Figure 11:
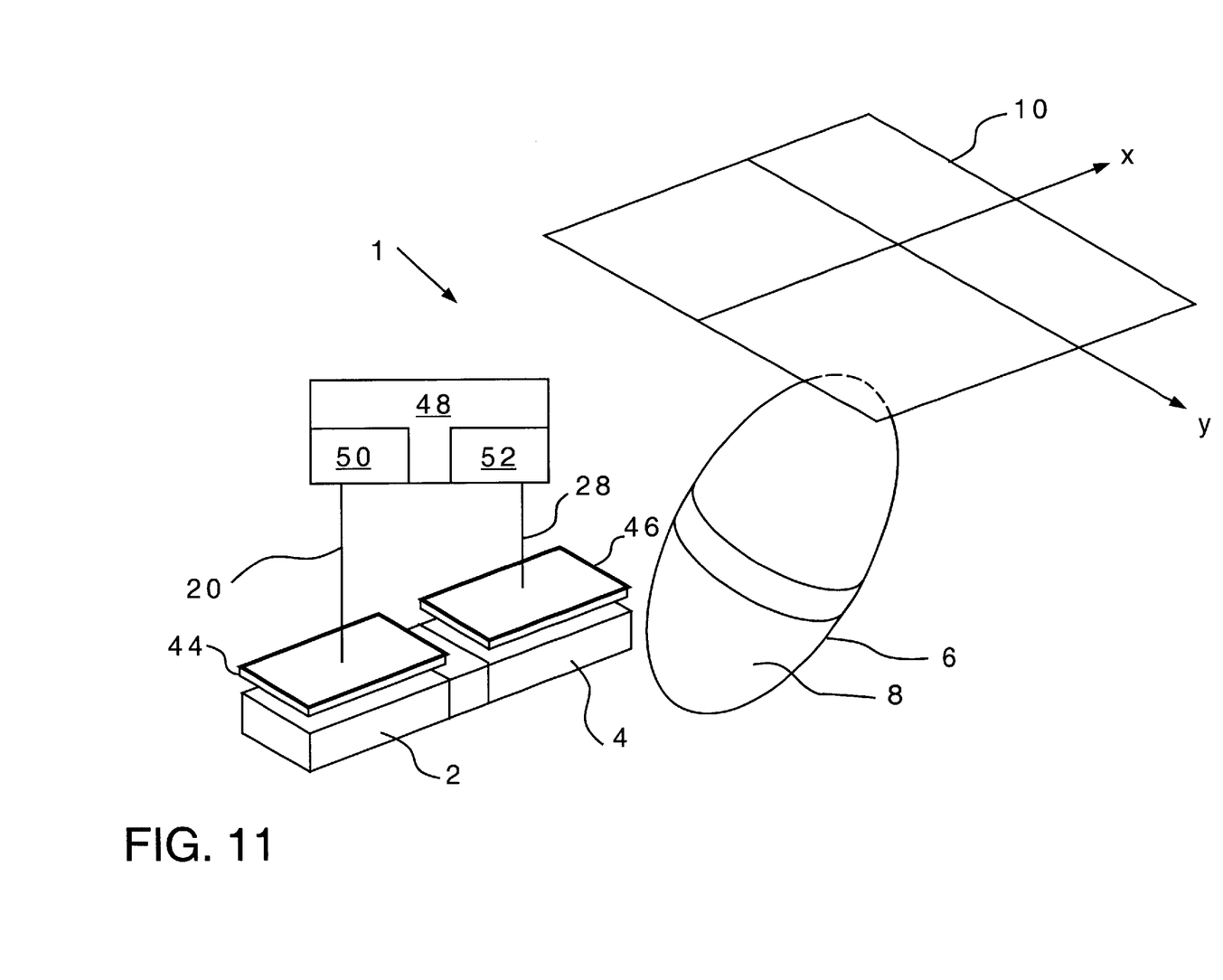
FIG. 11 is a perspective view of the device illustrated in FIG. 1, wherein an apparatus for controlling the first and second beam scanners includes first and second adjustable power sources and first and second transducers.

FIG. 9 illustrates one of the many possible embodiments of the device 1 designed to display different display points in quick succession. The apparatus for controlling the first and second beam scanners 2, 4 could, for example, include a single computer 42. The computer 42 may send separate control signals 20, 28 to each beam scanner 2, 4 having a first transducer 44 and a second transducer 46, respectively. First and second electrodes 54, 56 or electrode sets may be used in place of the first and second transducers 44, 46, as illustrated in FIGS. 10 and 11. In that way, the computer 42 could calculate and transmit the appropriate control signals 20, 28 for each beam scanner 2, 4, respectively, such that the desired display points are displayed in the proper sequence. The control signals 20, 28 may be generated by first and second adjustable power sources, and may be converted by the transducers 44, 46 so that the appropriate physical force or effect is applied to the optic material of the beam scanners 2, 4. The appropriate physical force or effect may be, for example, an electric field in the case of an electro-optic beam scanner, an acoustic field in the case of an acousto-optic beam scanner or a thermal field in the case of a thermo-optic beam scanner. In an electro-optic beam scanner, for example, electro-optic material may be sandwiched between opposing electrodes. An electric field may then be applied to both beam scanners 2, 4 or distinct electric fields may be applied to independent electrodes in separate cooperation with each beam scanner 2, 4 to control the angle of deflection.

FIG. 10 illustrates another embodiment of the present invention in which an apparatus for controlling the first and second beam scanners 48 includes first and second adjustable power sources 50, 52 and first and second electrodes 54, 56. The first adjustable power source 50 supplies power to the first beam scanner 2 corresponding with the amount of deflection desired at the first beam scanner 2. The second adjustable power source 52, likewise, supplies power to the second beam scanner 2 corresponding with the amount of deflection desired at the second beam scanner 2. The first electrode 54 responds to the first adjustable power source 50 and acts in cooperation with the first beam scanner 2 to apply power from the first adjustable power source 50 to the first beam scanner 2. The second electrode 56, similarly, acts in cooperation with the second adjustable power source 52 and second beam scanner 4.

FIG. 11 illustrates an embodiment of the device 1 in which first and second transducers 44, 46 are utilized in place of first and second electrodes 54, 56 to convert the first and second control signals 20, 28 to the appropriate physical force or effect to which the beam scanners 2, 4 respond.

FIG. 9 illustrates the beam scanners 2, 4 with an air gap 58 provided between them. The beam scanners 2, 4 may, alternately, be butted against each other. In another embodiment, the beam scanners may be fabricated, integrally, on a single substrate, as illustrated in FIG. 7. Optical elements such as, for example, lenses (not shown) or corrective apparatuses, may be placed intermediate the scanners 2, 4 to enhance the performance of the device 1 or to correct. distortion or degradation of the transitional output beam 22a. Optical elements to be located between the first and second beam scanners 2, 4 may be fabricated apart from the beam scanners 2, 4 or, alternatively, may be fabricated, integrally, on a single substrate with the beam scanners 2, 4.

Figure 12:
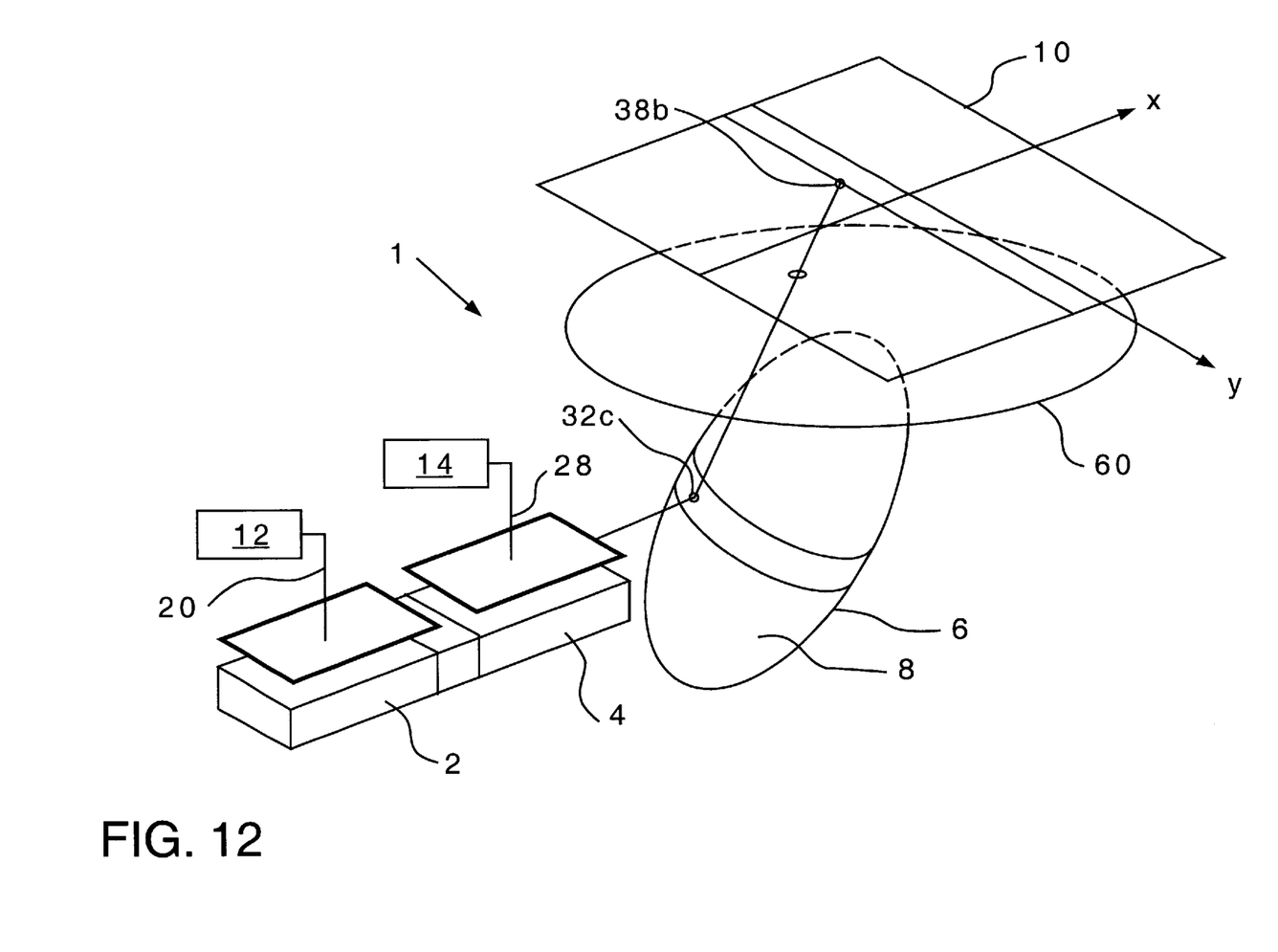
FIG. 12 is a perspective view of the device illustrated in FIG. 1 wherein a corrective apparatus is positioned between the intermediate surface and the two-dimensional display plane.

FIG. 12 illustrates a corrective apparatus 60. The corrective apparatus 60 may be utilized between the second output area 30 and the two-dimensional display plane 10 to alter the output beam 22b projected onto the two-dimensional display plane 10. The corrective apparatus 60 may take the form of a lens, for example, and may be placed between the intermediate surface 8 and the two-dimensional display plane 10 to focus an oval point of light so as to create a round point of light on the display plane 10. Alternately, other optical elements may be utilized intermediate the second beam scanner 4 and the intermediate surface 8 or intermediate the intermediate surface and the two-dimensional display plane to modify the projected beam 22c as desired.

The present invention may also include a method for projecting an input beam 16 onto a two-dimensional display plane 10. The input beam 16 is passed through two beam scanners 2, 4 configured in series. The angle of the output beam 22b with respect to the intermediate surface 8 and the point of incidence 32 of the output beam 22b on the intermediate surface are controlled. The output beam 22b is projected from the intermediate surface 8 onto the two-dimensional display plane 10. The method may also include passing the output beam 22b through corrective apparatuses 48 so as to further modify the output beam 22b.

Those of ordinary skill in the art will recognize that many modifications and variations of the present invention may be implemented. The foregoing description and the following claims are intended to cover all such modifications and variations. Furthermore, the materials and processes disclosed are illustrative of the invention but are not exhaustive. Other materials and processes may also be used to utilize the present invention.

What is claimed is:

1. A device, comprising:
   a projection element having an intermediate surface;
   first and second beam scanners configured in series for projecting an output beam on said intermediate surface, the output beam having an angle of incidence with respect to said intermediate surface and a point on incidence on said intermediate surface;
   a two-dimensional display plane for receiving a beam projected from said intermediate surface; and
   an apparatus for controlling said first and second beam scanners such that said angle of incidence and said point of incidence are separately controllable, wherein said point of incidence is controlled so as to step though a predetermined number of points and said angle of incidence is controlled so as to scan through a predetermined range of angles for each point.

2. The device of claim 1, wherein said first and second beam scanners include electro-optic beam scanners.

3. The device of claim 1, wherein said first and second beam scanners include acousto-optic beam scanners.

4. The device of claim 1, wherein said first and second beam scanners include thermo-optic beam scanners.

5. The device of claim 1, wherein each said point of incidence on said intermediate surface maps to a line on said two-dimensional display plane by varying said angle of incidence.

6. The device of claim 1, wherein said projection element includes a mirror.

7. The device of claim 6, wherein said mirror is curved.

8. The device of claim 6, wherein said mirror is flat.

9. The device of claim 6, wherein said mirror comprises at least two mirror segments oriented at different angles with respect to each other.

10. The device of claim 1, wherein said projection element includes a lens.

11. The device of claim 1, wherein said first beam scanner deflects a beam in a first plane and said second beam scanner deflects a beam in a second plane parallel to said first plane.

12. The device of claim 1, wherein said first beam scanner deflects a beam in a first plane and said second beam scanner deflects a beam in said first plane.

13. The device of claim 1, wherein:
   said first beam scanner has a first output area and said control apparatus controls said first beam scanner-to deflect a beam in a first direction; and
   said second beam scanner has a second output area and said control apparatus controls said second beam scanner to deflect a beam in a second direction, said first direction and said second direction lying in a plane.

14. The device of claim 1, wherein said apparatus for controlling said first and second beam scanners includes a computer.

15. The device of claim 14, wherein said computer calculates at least one control signal to direct the beam to a desired display point.

16. The device of claim 15, wherein said computer transmits at least one control signal to direct the beam to a desired display point.

17. The device of claim 1, wherein:
   said apparatus for controlling said first beam scanner includes a first adjustable power source and at least one first electrode responsive to said first adjustable power source; and
   wherein said apparatus for controlling said second beam scanner includes a second adjustable power source and at least one second electrode responsive to said second adjustable power source.

18. The device of claim 17, wherein said first adjustable power source varies a first angle of deflection of a first transitional output beam in a plane and said second adjustable power source varies a second angle of deflection of a second transitional output beam in said plane.

19. The device of claim 1, wherein:
   said apparatus for controlling said first and second beam scanners includes a first adjustable power source and at least one first transducer, responsive to said first adjustable power source, in cooperation with said first beam'scanner; and
   a second adjustable power source and at least one second transducer, responsive to said second adjustable power source, in cooperation with said second beam scanner.

20. The device of claim 1, wherein said first beam scanner is in contact with said second beam scanner.

21. The device of claim 20, wherein said first beam scanner has an first output area and said second beam scanner has a second input area, said first output area contacting said second input area.

22. The device of claim 1, further comprising an air gap provided intermediate said first and second beam scanners.

23. The device of claim 1, wherein said first and second beam scanners are combined on a single substrate.

24. The device of claim 1, further comprising an optical element disposed intermediate said first beam scanner and said second beam scanner.

25. The device of claim 24, wherein said optical element is a lens.

26. The device of claim 1, further comprising an optical element disposed intermediate said second beam scanner and said two-dimensional display plane.

27. The device of claim 26, wherein said optical element is disposed intermediate said second beam scanner and said intermediate surface.

28. The device of claim 26, wherein said optical element is disposed intermediate said intermediate surface and said two-dimensional display plane.

29. The device of claim 26, wherein said optical element is a lens.

30. A device, comprising:
   a first surface;
   a second beam scanner having a second beam input surface and a second beam output surface, said second beam input surface for receiving a beam, said second beam output surface for projecting an output beam having a second angle of incidence with respect to said first surface and a second point of incidence on said first surface;
   at least one second control apparatus in cooperation with said second beam scanner, said second control apparatus varying said second angle of incidence and said second point of incidence;

a first beam scanner having a first beam input surface for receiving a beam and a first beam output surface for projecting a transitional beam, having a first angle of incidence with respect to said second beam input surface and a first point of incidence on said second beam input surface, said first beam scanner configured in series with said second beam scanner;

at least one first control apparatus in cooperation with said first beam scanner, said first control apparatus varying said first angle of incidence and said first point of incidence; and a display surface for receiving a projected beam projected from said first surface.

31. The device of claim 30, wherein:

said projected beam forms at least two points on a first line when said second point of incidence on said first surface remains unchanged an d said angle of incidence on said first surface is varied; and said projected beam forms at least two points on a second line by projecting said projected beam onto a second point of incidence on said first surface and varying said angle of incidence on said first surface.

32. A method of projecting a beam on a two-dimensional display plane, comprising:

passing a beam through series configured beam scanners to produce an output beam;

separately controlling the angle of incidence with respect to an intermediate surface and the point of incidence on the intermediate surface by stepping the point of incidence through a predetermined number of points and scanning the angle of incidence through a predetermined range of angle for each point; and projecting the beam on the two-dimensional display plane.

33. The method of claim 32, further comprising modifying a beam incident on an optical element.

34. The method of claim 32, further comprising aligning the first and second beam scanners such that a range of operation at an output area of the first beam scanner lies in the same plane as a range of operation at an output area of the second beam scanner.

35. The method of claim 32, wherein said controlling includes controlling a first beam scanner and separately controlling a second beam scanner.

36. The method of claim 32, further comprising randomly accessing any point on the-display plane.

37. The method of claim 32, wherein at least two discrete display points are displayed successively on the two-dimensional display plane.

38. The method of claim 32, further comprising applying at least one physical force to the first and second beam scanners.

39. The method of claim 38, wherein a first physical force is applied to the first beam scanner and a second physical force is applied to the second beam scanner.

40. A method of switch actuation, comprising:

passing a beam through series configured beam scanners to produce at output beam;

separately controlling the angle of incidence of the output beam with respect to an intermediate surface and the point of incidence of the output beam on the intermediate surface by stepping the point of incidence through a predetermined number of points and scanning the angle of incidence through a predetermined range of angle for each point; and projecting the beam onto at least one fiber optic switch input.

41. A device for projecting a beam on a two-dimensional display plane, comprising:

first and second series configured beam scanners to produce an output beam:

means for separately controlling the angle of incidence of the output beam with respect to an intermediate surface and the point of incidence on the intermediate surface of the output beam by stepping the point of incidence through a predetermined number of points and scanning the angle of incidence through a predetermined range of angle for each point; and means for projecting the beam on a two-dimensional display plane.

42. A switch actuating device, comprising:

first and second series configured beam scanners to produce an output beam;

means for separately controlling the angle of incidence of the output beam with respect to an intermediate surface and the point of incidence of the output beam on the intermediate surface by stepping the point of incidence through a predetermined number of points and scanning the angle of incidence through a predetermined range of angle for each point; and means for projecting the beam onto at least one fiber optic switch input.

43. A device, comprising:

a projection element having an intermediate surface, wherein said projection element includes a curved mirror;

first and second beam scanners configured in series for projecting a beam on said intermediate surface;

a two-dimensional display plane for receiving a beam projected from said intermediate surface; and an apparatus for controlling said first and second beam scanners.

44. A device, comprising:

a projection element having an intermediate surface;

first and second beam scanners configured in series for projecting a beam on said intermediate surface;

a two-dimensional display plane for receiving a beam projected from said intermediate surface; and an apparatus for controlling said first and second beam scanners, wherein:

said first beam scanner has a first output area and said control apparatus controls said first beam scanner to deflect a beam in a first direction; and said second beam scanner has a second output area and said control apparatus controls said second beam scanner to deflect a beam in a second direction, said first direction and said second direction lying in a plane.

45. A device, comprising:

a projection element having an intermediate surface;

first and second beam scanners configured in series for projecting a beam on said intermediate surface;

a two-dimensional display plane for receiving a beam projected from said intermediate surface; and an apparatus for controlling said first and second beam scanners, wherein said apparatus includes:

a first adjustable power source and at least one first electrode responsive to said first adjustable power source for controlling said first beam scanner; and a second adjustable power source and at least one second electrode responsive to said second adjustable power source for controlling said second beam scanner, and wherein said first adjustable power source varies a first angle of deflection of a first transitional output beam in a plane and said second adjustable power source varies a second angle of deflection of a second transitional output beam in said plane.

46. A method of projecting a beam on a two-dimensional display plane, comprising:

passing a beam through series configured beam scanners to produce an output beam;

controlling the angle of incidence with respect to an intermediate surface and the point of incidence on the intermediate surface;

projecting the beam on the two-dimensional display plane; and randomly accessing any point on the display plane.

47. A method of projecting a beam on a two-dimensional display plane, comprising:

passing a beam through series configured beam scanners to produce an output beam;

controlling the angle of incidence with respect to an intermediate surface and the point of incidence on the intermediate surface, wherein said controlling further comprises:

maintaining a constant angle of incidence with respect to the intermediate surface; and varying the point of incidence on the intermediate surface; and projecting the beam on the two-dimensional display plane.

48. The method of claim, 47, wherein at least two discrete display points are formed on different display lines.

49. The method of claim 47, wherein a first physical force is applied to the first beam scanner and a second physical force is applied to the second beam scanner.

50. A method of projecting a beam on a two-dimensional display plane, wherein the beam is scanned along a display line, comprising:

passing a beam through series configured beam scanners to produce an output beam;

controlling the angle of incidence with respect to an intermediate surface and the point of incidence on the intermediate surface, wherein said controlling further comprises:

maintaining a constant angle of incidence with respect to the intermediate surface; and varying the point of incidence on the intermediate surface; projecting the beam on the two-dimensional display plane; stepping the beam to at least one different point of incidence; and scanning the beam along a different display line.

51. A method of projecting a beam on a two-dimensional display plane, comprising:

passing a beam through series configured beam scanners to produce an output beam;

controlling the angle of incidence with respect to an intermediate surface and the point of incidence on the intermediate surface;

projecting the beam on the two-dimensional display plane; and applying at least one physical force to the first and second beam scanners.

\* \* \* \* \*